United States Patent [19]
Cole

[11] Patent Number: 4,709,362
[45] Date of Patent: Nov. 24, 1987

[54] OSCILLATING ORBITAL VIBRATOR

[75] Inventor: Jack H. Cole, Ponca City, Okla.

[73] Assignee: Conoco Inc., Ponca City, Okla.

[21] Appl. No.: 781,385

[22] Filed: Sep. 27, 1985

[51] Int. Cl.$^4$ ............................................. H04R 11/00
[52] U.S. Cl. .................................. 367/189; 181/121; 73/667; 310/81
[58] Field of Search ................... 73/667, 672; 181/113, 181/114, 121, 401; 310/81; 367/189, 190; 74/64, 86, 87, 88

[56] References Cited

U.S. PATENT DOCUMENTS

| | | | |
|---|---|---|---|
| 1,027,403 | 5/1912 | Darling | 310/81 |
| 1,392,345 | 10/1921 | Lowe | 310/81 |
| 1,881,332 | 10/1982 | Sonntag | 73/672 |
| 1,970,233 | 8/1934 | Hertzberg | 73/667 |
| 2,438,755 | 3/1948 | Larsen | 73/667 |
| 2,745,507 | 5/1956 | Bodine, Jr. | 181/0.5 |
| 2,989,869 | 6/1961 | Hanggi | 74/61 |
| 3,244,252 | 4/1966 | Burns | 181/0.5 |
| 3,406,782 | 10/1968 | Bodine | 181/0.5 |
| 3,580,059 | 5/1971 | Dalton | 73/672 |
| 3,671,785 | 6/1972 | Fuch et al. | 310/81 |
| 3,934,673 | 1/1976 | Silverman | 181/119 |
| 3,999,626 | 12/1976 | Adams | 181/114 |
| 4,034,246 | 7/1977 | Wakashima et al. | 181/121 |
| 4,234,053 | 11/1980 | Erich | 181/121 |
| 4,327,814 | 5/1982 | Erich | 181/121 |
| 4,590,814 | 5/1986 | Wadensten | 310/81 |

FOREIGN PATENT DOCUMENTS

| | | | |
|---|---|---|---|
| 2046215 | 5/1979 | Fed. Rep. of Germany | 73/667 |
| 0025891 | 3/1981 | Japan | 367/189 |

OTHER PUBLICATIONS

"Material Flow-Aid Systems, Quake Series Heavy Duty Industrial Vibration Inducers"-date and author unknown.

Primary Examiner—Deborah L. Kyle
Assistant Examiner—Brian S. Steinberger
Attorney, Agent, or Firm—Richard K. Thomson

[57] ABSTRACT

An orbital vibratory mass is used for generating seismic signals and the like. An annular reaction mass is mounted on a crank by means of bearing. The reaction mass orbitally oscillates relative to the axis of the crank shaft without rotating. This reduces the internal forces created in the reaction mass by centrifugal force and enables less exotic, less expensive materials to be used in its construction.

19 Claims, 4 Drawing Figures

OSCILLATING ORBITAL VIBRATOR

BACKGROUND AND SUMMARY OF THE INVENTION

The present invention relates to an improved orbital vibrator. More particularly, the present invention relates to an orbital vibrator of the type used to generate seismic reference signals in geophysical prospecting systems.

The use of orbital vibrators as seismic waveform generators is well known in the area of geophysical prospecting for oil, or the like. Typically, the vibrators take the form of eccentric swinging weights which are used in various combinations to generate the desired seismic signal(s). See for example U.S. Pat. Nos. 2,745,507; 2,989,869; and 4,234,053.

In order to generate a seismic signal of sufficient magnitude, these swinging weights must be of appreciable mass and be rotated at rates which may exceed 3000 r.p.m. Accordingly, these weights are subjected to large internal pressures as a result of centrifugal force. Further, the drag due to wind resistance (composed of frontal area drag and skin friction components) increase these internal pressures and decrease the efficiency of the system. Accordingly, these orbital vibrators must be constructed of exotic, and hence expensive, high strength materials.

It is an object of the present invention to provide an improved orbital vibrator which will overcome these deficiencies. The orbital vibrator of the present invention comprises a hollow cylindrical reaction mass which is mounted by means of a bearing on a crank shaft. The eccentricity of the crank causes the reaction mass to orbitally oscillate about the center line of the shaft in response to the shaft's rotation. Since there is no leading edge on the weight of the present invention, there is a significant reduction in frontal area drag. The fact that the orbital vibrator does not rotate at high speed but rather orbitally oscillates serves to further reduce drag losses resulting from the skin friction component. The reduction of the internal pressures to which the orbital vibrator is exposed enables a less expensive material to be used.

These and other features, characteristics and advantages of the present invention will become apparent after reading the following specification.

DETAILED DESCRIPTION OF THE PREFERRED EMBODIMENT(S)

Figure 2:
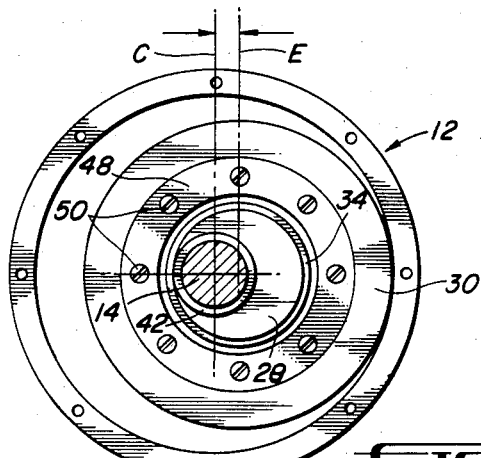
FIG. 2 is a lateral cross-sectional view of the orbital vibrator of the present invention as seen along line 2—2 in FIG. 1.
Figure 1:
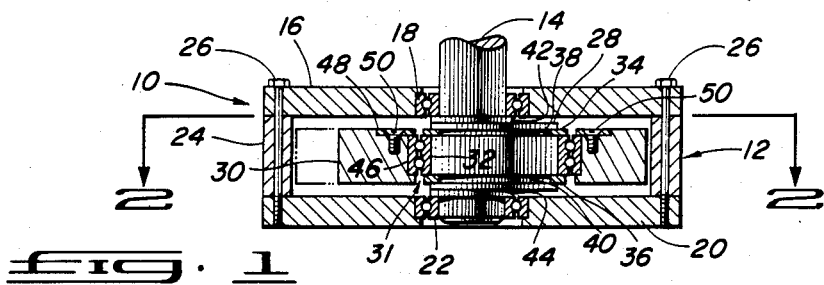
FIG. 1 is a partial vertical cross-sectional view of the orbital vibrator of the present invention.

The orbital vibrator of the present invention is shown in FIGS. 1 and 2 generally at 10. The orbital vibrator 10 comprises a housing shown generally at 12. Crank shaft 14 extends through the top wall 16 of the housing and is supported therein for rotation by bearing 18. The terminal end of shaft 14 is received in rotary bearing 22 in the bottom wall 20 of housing 12. Although the bearings have all been depicted as ball bearings in the drawing, they could be roller bearings or other suitable bearings, if desired.

Top wall 16 and bottom wall 20 of housing 12 are secured to annular wall 24 by a plurality of threaded fasteners 26. Fasteners 26 are depicted as threadingly engaging bottom wall 20 but could, alternatively, extend beyond wall 20 and be secured by conventional nuts (not shown). As a further alternative, the annular wall 24 or the bottom of housing 12 could be formed with integral flanges for attachment to a platform, or the like.

The crank comprises a circular disc-shaped member 28 whose centerline E is mounted eccentrically to the centerline C of crank shaft 14. Preferably, circular eccentric member 28 is formed integrally on shaft 14, although member 28 could be a separate piece which is keyed to the shaft. Ordinarily, however, design criteria will dictate that member 28 be formed integrally with shaft 14 to provide the necessary strength.

Reaction mass 30 is formed as a hollow cylindrical member with a concentric circular opening which receives bearing 31. The inner race 32 of bearing 31 encircles the outside of disc-shaped member 28 and is retained thereon by snap rings 34 and 36 which are received in grooves 38 and 40, respectively, which are formed in the periphery of circular member 28. Shoulders 42 and 44 are formed on either side of circular member 28 and engage bearings 18 and 22 which are thrust bearings as well as rotary bearings. Shoulders 42 and 44 coact with thrust bearings 18 and 22 to prevent axial movement of orbital vibrator 10 along shaft 14. While it is again preferred that shoulders 42 and 44 be formed integrally with shaft 14, where circular member 28 is a separate piece, one or both shoulders 42 and 44 can be provided by a circlip engaging in annular grooves (not shown).

Outer race 46 of bearing 31 is secured in place about the inner periphery of reaction mass 30 by virtue of an annular shoulder formed on reaction mass 30 and an annular retaining ring 48 secured to the opposite side of reaction mass 30 by a plurality of threaded fasteners 50.

Figure 4:
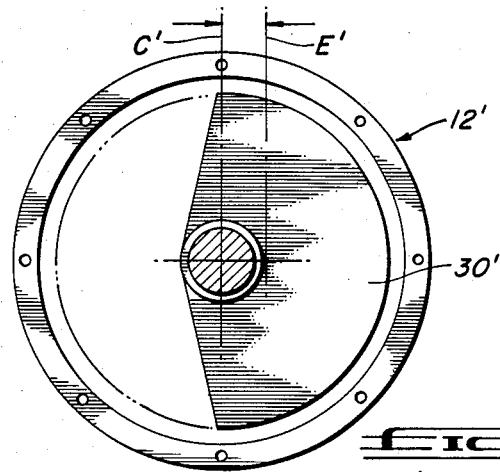
FIG. 4 is a lateral cross-sectional view similar to FIG. 2 of the prior art device as seen along line 4—4 in FIG. 3.
Figure 3:
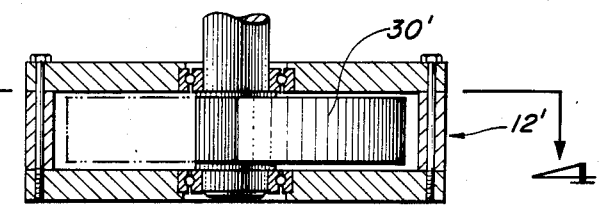
FIG. 3 is a vertical cross-sectional view similar to FIG. 1 of a prior art swinging weight.

In operation, crank shaft 14 is rotated at a high rate of speed and eccentrically mounted disc-shaped member 28 causes reaction mass 30 to orbitally oscillate with respect to the centerline C of shaft 14. Reaction mass 30 does not experience significant rotational motion as was required of swinging weight 30' (FIGS. 3 and 4). In fact, reaction mass 30 is designed to remain stationary during the operation of the orbital vibrator 10 of the present invention with the shaft 14, housing 12 and the member to which the vibrator is attached experiencing the desired vibrational motion. By utilizing these weights on paired counter-rotating shafts, the horizontal component of vibration can be canceled resulting in the vertical component, only, being retained to produce a seismic signal.

Comparing the orbital vibrator of the present invention with the prior art device depicted in FIGS. 3 and 4, it can be seen that the orbitally oscillating reaction mass has the following advantages. (1) There is no pronounced leading edge to create wind resistance losses due to frontal area drag. (2) A point on the periphery of the reaction mass travels only a distance equivalent to the circumference of the circular member 28 rather than entirely around the perimeter of the rotational envelope. This means the velocity of such a point is significantly reduced. With reduced velocity, wind drag forces (a function of velocity squared) and the internal forces within the reaction mass created by centrifugal force are reduced even more. (3) Because the forces to which the reaction mass is exposed are significantly reduced, the reaction mass 30 can be made of softer, less expensive materials. For example, the reaction mass can be made of carbon steel rather than the more expensive high strength alloys. Only the bearing 31 need be made of high strength materials (i.e., alloy steel). If desired, an annular envelope of high strength material could be used to gird the periphery of the reaction mass of the present invention. Such a ring would protect against possible failure should a bearing lock subjecting the reaction mass to the centrifugal forces of swinging weights.

The force F generated by an orbital or swinging weight is given by the expression $$F = \frac{W}{g} (2\pi f)^2 e$$

where W is the weight of the mass, g is the gravitational constant, f is the frequency in cycles per unit time and e is the eccentricity. Due to the reduction of the drag and the corresponding forces experienced by the reaction mass of the present invention, the material from which the weight is made can be selected to optimize the mass of weight rather than strength. In addition, since the orbital weight is configured as a complete annulus rather than a segment of a circle, it can comprise a larger mass. Since the weight of the orbital mass is greater, a smaller eccentricity (i.e., shorter distance between centerlines C and E) can be used to produce an equivalent force or a greater force can be produced with an equivalent eccentricity.

The orbital vibrator of the present invention improves efficiency by reducing wind resistance losses occurring as a result of both frontal drag and skin friction. These reductions occur due in part to the configuration of the orbital mass (i.e., no leading edge) and in part due to a lower rotational velocity. In addition, the lower rotational velocity decreases the internal pressures resulting from centrifugal force permitting the use of less expensive, higher density materials which further increases efficiency.

Although the orbital vibrator of the present invention has been disclosed specifically in conjunction with seismic prospecting equipment, it will be appreciated that this vibrator might be used for other purposes as well. For example, the orbital vibrator of the present invention might be used to produce vibratory energy used to insure material movement in hoppers, silos, or to produce motion of a vibratory conveyor or the like.

Various changes, alternatives or variations will become apparent to a person of ordinary skill in the art following a reading of the foregoing specification. It is intended that all such changes, alternatives, and variations as fall within the scope of the appended claims be considered part of the present invention.

I claim:
1. An oscillating orbital vibrator comprising;
  (a) a rotatable shaft;
  (b) a crank mounted on said shaft for rotation therewith, said crank having an outer periphery;
  (c) a first race of a cylindrical bearing affixed to said outer periphery of said crank;
  (d) a reaction mass having a cylindrical opening therein, said opening having an inner periphery;
  (e) a second race of said cylindrical bearing affixed to said inner periphery of said opening;
  (f) bearing means positioned between said first and second bearing races; whereby when said shaft and crank are rotated, said reaction mass orbitally oscillates with respect thereto inducing a vibratory motion.

2. The oscillating orbital vibrator of claim 1 wherein said crank comprises a disc-shaped member with a centerline which is eccentrically positioned relative to the centerline of said rotatable shaft.

3. The oscillating orbital vibrator of claims 2 wherein said disc-shaped member is keyed to said rotatable shaft.

4. The oscillating orbital vibrator of claim 1 wherein said bearing means comprises ball bearings.

5. The oscillating orbital vibrator of claim 1 wherein said reaction mass is generally circular in cross section, has a centerline and said cylindrical opening therein is concentric with the centerline of said reaction mass.

6. The oscillating orbital vibrator of claim 5 wherein said bearing is constructed of high-strength steel.

7. The oscillating orbital vibrator of claim 1 further comprising a generally cylindrical housing enshrouding said reaction mass.

8. The oscillating orbital vibrator of claim 7 wherein said rotatable shaft is journalled for rotation in said housing.

9. In a seismic waveform generator, means for generating periodic seismic signals on a continuous basis, said means comprising:
  (a) a cylindrical housing;
  (b) a rotatable shaft journaled in said housing, said shaft having a crank mechanism connected thereto;
  (c) a reaction mass mounted on said crank mechanism by means of a bearing, said reaction mass orbitally oscillating about said crank mechanism in response to the activation of said rotatable shaft, to produce a vibratory motion.

10. The seismic waveform generator of claim 9 wherein the crank mechanism comprises a disc-shaped member whose center is eccentrically positioned relative to the centerline of said shaft.

11. The seismic waveform generator of claim 10 wherein said disc-shaped member is formed integrally with said shaft.

12. The seismic waveform generator of claim 10 wherein said disc-shaped member is keyed to said rotatable shaft.

13. The seismic waveform generator of claim 9 wherein said reaction mass is generally cylindrical with a concentric cylindrical opening therein.

14. The seismic waveform generator of claim 13 wherein said concentric cylindrical opening receives said bearing.

15. The seismic waveform generator of claim 14 wherein said bearing is constructed of high strength steel.

16. The seismic waveform generator of claim 9 wherein the reaction mass is constructed of carbon steel.

17. The seismic waveform generator of claim 9 wherein said rotatable shaft includes two shoulders, one on each side of said crank mechanism, which engage the bearings in which the rotatable shaft is journaled to maintain the position of said shaft with respect to the housing.

18. The seismic waveform generator of claim 9 wherein the bearing mounting said reaction mass has an inner race and an outer race.

19. The seismic waveform generator of claim 18 wherein the inner race of said bearing is secured to the crank mechanism by a pair of snap rings.

* * * * *